P. O'LEARY.
CLAMPING DEVICE.
APPLICATION FILED MAY 22, 1914.

1,120,403.

Patented Dec. 8, 1914.

WITNESSES:
Henry D. Thompson
Chas. J. Pearson

INVENTOR
Patrick O'Leary
BY
ATTORNEY

UNITED STATES PATENT OFFICE.

PATRICK O'LEARY, OF NEW YORK, N. Y.

CLAMPING DEVICE.

1,120,403.

Specification of Letters Patent. Patented Dec. 8, 1914.

Application filed May 22, 1914. Serial No. 840,149.

*To all whom it may concern:*

Be it known that I, PATRICK O'LEARY, a citizen of the United States, residing in the borough of Brooklyn, city of New York, county of Kings, and State of New York, have invented certain new and useful Improvements in Clamping Devices, of which the following is a specification.

My invention relates to improvements in a clamping device, and the object of my invention is to provide a simple and useful device for the purpose of clamping sheets of paper or the like to a drawing-board or the like. I accomplish this object by the device illustrated in the accompanying drawings, in which—

Figure 1:
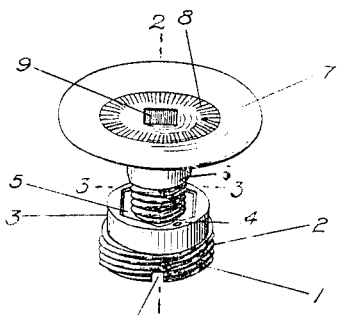
Figure 2:
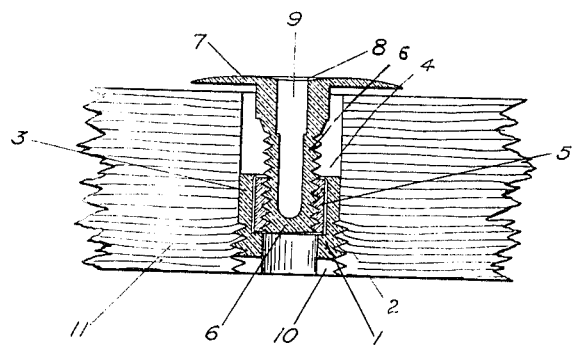
Figure 3:
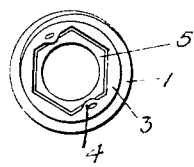

Figure 1 is a perspective view of the device. Fig. 2 is a vertical section of the same on the line 2—2 in Fig. 1, and Fig. 3 is a cross section of the same on the line 3—3 in Fig. 1.

Similar characters refer to similar parts throughout the several views.

My device comprises a nut 1 provided with external screw threads 2, and formed with an upstanding flange 3, having an inwardly projecting lip 4, and preferably provided with a hexagonal inner face. The space within the flange 3 and lip 4 forms a chamber in which I provide an internally screw threaded floating nut 5. This nut 5 is preferably hexagonal in cross section, and fits loosely within the flange 3 of the nut 1. The clamping headed screw shaft or member comprises an externally screw threaded shaft 6 adapted to fit into the floating nut 5 and to engage its internal screw threads and is provided with a flat head section 7, preferably provided with a dished central section 8 which is milled or otherwise provided with a rough surface to enable it to be readily turned by frictional engagement with the thumb of the operator. I also provide a kerf or socket 9 to receive a pin or wrench of any desired formation for the purpose of more easily turning the screw shaft 6. I also preferably cut a kerf 10 in the underside of the nut 1, whereby it may be screwed into the table or drawing-board 11. My device being thus assembled, the nut 1 with its floating nut 5 is screwed into a drawing-board or table 11, with the upper edge section or lip 4 of the nut 1 preferably below the surface of the table, in which position it is adapted to receive the shaft 6 of the clamping member. The paper or other material to be clamped is then suitably adjusted with its edge below the flat head 7 of the clamping member 6, which is then screwed down upon the paper, securely clamping it to the board, and the paper may be released by a slight reverse turn of the clamping member 6. By reason of the floating nut the head of the clamping member 6 will adjust itself to varying thicknesses of paper, and will securely clamp either a very thin or very thick sheet.

Having thus described my invention, what I claim is:

1. In a device of the character described, the combination of a nut adapted to be positioned in a table and formed with an upstanding flange provided with an inwardly projecting lip, forming a chamber in which is disposed a screw threaded floating nut adapted to receive a screw threaded clamping member.

2. In a device of the character described, the combination of a nut adapted to be positioned in a table and formed with an upstanding flange provided with a plurality of flat inner faces and having an inwardly projecting lip, forming a chamber in which is disposed a screw threaded floating nut having a plurality of flat faces and adapted to receive a screw threaded clamping member.

3. In a device of the character described, the combination of a nut adapted to be positioned in a table and formed with an upstanding flange provided with a plurality of flat inner faces, forming a chamber in which is disposed a screw threaded floating nut having a plurality of flat faces and adapted to receive a screw threaded clamping member.

In testimony whereof, I have signed my name to this specification in the presence of two subscribing witnesses, this 19th day of May, 1914.

PATRICK O'LEARY.

Witnesses:
JUSTINE P. GALLAND,
HENRY B. THOMPSON.